United States Patent [19]
Etnyre et al.

[11] Patent Number: 5,823,552
[45] Date of Patent: Oct. 20, 1998

[54] STRUT TYPE REAR SUSPENSION

[75] Inventors: Edwin L. Etnyre, Warren; John O. Heimbecher, Berkley, both of Mich.

[73] Assignee: Chrysler Corporation, Auburn Hills, Mich.

[21] Appl. No.: 918,027

[22] Filed: Aug. 25, 1997

[51] Int. Cl.⁶ .................................................. B60G 1/00
[52] U.S. Cl. ........................... 280/124.179; 280/124.154; 280/124.142
[58] Field of Search .................. 280/124.179, 124.154, 280/124.142, 124.146, 124.126, 124.125; 267/286, 288, 221, 34

[56] References Cited

U.S. PATENT DOCUMENTS

| | | |
|---|---|---|
| 2,285,954 | 6/1942 | Wahlberg . |
| 2,322,890 | 6/1943 | Slack . |
| 2,967,063 | 1/1961 | Mueller et al. . |
| 3,024,039 | 3/1962 | Zeigler et al. . |
| 3,136,565 | 6/1964 | Bischoff et al. ................. 280/124.142 |
| 3,177,965 | 4/1965 | Dews . |
| 3,672,698 | 6/1972 | Froumajou ....................... 280/124.154 |
| 3,756,542 | 9/1973 | Loffler . |
| 3,810,651 | 5/1974 | Puchas . |
| 3,871,467 | 3/1975 | Sefte et al. . |
| 3,891,232 | 6/1975 | Flemming . |
| 3,952,824 | 4/1976 | Matschinsky .................... 280/124.179 |
| 4,087,117 | 5/1978 | Brace et al. ..................... 280/124.179 |
| 4,511,160 | 4/1985 | Inoue . |
| 4,515,391 | 5/1985 | Koide . |
| 4,542,920 | 9/1985 | Kijima et al. . |
| 4,653,772 | 3/1987 | Sautter ............................. 280/124.146 |
| 4,715,614 | 12/1987 | Kijima et al. . |
| 4,715,615 | 12/1987 | Kijima et al. . |
| 4,758,018 | 7/1988 | Takizawa et al. . |
| 4,765,647 | 8/1988 | Kondo et al. . |
| 4,790,560 | 12/1988 | Asanuma et al. . |
| 4,815,755 | 3/1989 | Takata et al. . |
| 4,828,237 | 5/1989 | Neff . |
| 4,957,308 | 9/1990 | Takizawa . |
| 4,997,201 | 3/1991 | Schaible ........................... 280/124.179 |
| 5,005,857 | 4/1991 | Camuffo . |
| 5,456,486 | 10/1995 | Lee . |

*Primary Examiner*—Christopher P. Ellis
*Attorney, Agent, or Firm*—Roland A. Fuller, III

[57] ABSTRACT

A vehicle suspension system is disclosed, to which can be mounted a vehicle wheel and tire, with the tire having a tread surface defining a cylindrical plane. The suspension system includes a cross frame member having a relatively inboard portion and an outboard portion, the outboard portion includes an upper spring seat portion. A spindle knuckle includes a spindle to which a wheel can be coupled. The spindle is coupled to the spindle knuckle. A suspension strut is coupled between the spindle knuckle and the cross frame member. The suspension strut includes a strut housing having a lower end and an upper end, a piston axially moveable with respect to the strut housing, and a lower spring seat fixedly coupled to the strut housing. A coil spring is disposed concentrically around the strut housing. The coil spring includes an upper end received by the upper spring seat portion, and a lower end received by the lower spring seat. The upper spring seat, lower spring seat and coil spring are disposed within the cylindrical plane defined by the tire tread surface.

20 Claims, 5 Drawing Sheets

STRUT TYPE REAR SUSPENSION

TECHNICAL FIELD OF THE INVENTION

The present invention relates to vehicle suspension systems and more particularly to strut-containing vehicle suspension systems that are particularly well adapted for use on the rear wheels of a front wheel drive vehicle.

BACKGROUND OF THE INVENTION

Even before the introduction of the automobile, vehicles, such as carriages have contained suspension systems that are designed to absorb the bumps and jolts caused by the wheel of the vehicle encountering an uneven road surface. The suspension system of contemporary vehicles connects the unsprung members of a vehicle, (such as the wheel and tire), to the sprung portion of the vehicle, which usually includes the vehicle's frame, body, engine compartment and/or trunk.

As the suspension system of the vehicle plays a major role in the vehicle's ride and handling characteristics, and needs to serve a variety of functions. One function is to impart an appropriate ride to the vehicle. For some vehicles, such as automobiles, this entails providing a ride which caters to the comfort of the passenger within the vehicle. On commercial vehicles such as large trucks, the comfort of the user is usually secondary to the ability of the vehicle to carry its intended load.

A second function served by the vehicle's suspension is to impart the desired handling characteristics to the vehicle. On some vehicles, the desired handling characteristics are those that give very tight and accurate control over the vehicle to produce a "sports car"-like ride. On other vehicles, the suspension system is designed to impart a more soft or "cushy" ride to the vehicle.

The third function served by the suspension system is to appropriately distribute to the vehicle's unsprung members, those forces caused by the vertical movement of the vehicle's wheel as it encounters bumps and depressions on the road surface.

In designing a suspension system appropriate for a vehicle, the automotive engineer seeks to design a system which will optimize those characteristics that the engineer desires to impart to the vehicle, so that it will have the desired ride and handling characteristics.

Another important factor that enters into the engineer's design decision relates to the amount of space that is required by the suspension system. It is often desirable to design a suspension system having minimal space requirements, as any space not being used for the suspension system can be devoted to other uses, such as additional trunk space, or additional interior room. In vehicles such as convertibles, it is advantageous to minimize the suspension system's space requirements, as a reduced-size rear suspension system leaves more room and space for placement of a folded convertible top.

One important component of a suspension system is the vibration dampening member.

The purpose of the vibration dampening member is to stop the oscillatory movement of a wheel after it encounters a bump or a pot hole.

One well-known type of vibration dampening device is a shock absorber. Examples of patents that disclose vehicle suspension systems containing shock absorbers include the following: Wahlberg, U.S. Pat. No. 2,285,954; Slack, U.S. Pat. No. 2,322,890; Mueller, et al., U.S. Pat. No. 2,967,063; Zeigler, et al., U.S. Pat. No. 3,024,039; Dews, U.S. Pat. No. 3,177,965; Flemming, U.S. Pat. No. 3,891,232; and Camuffo, U.S. Pat. No. 5,005,857.

Typically, a shock absorber containing suspension system includes a shock absorber for providing a vibration dampening function and an upper control arm of some type for controlling force inputs from the wheel. Many shock absorbers include a spring that is disposed concentrically around the exterior of the shock absorber for supporting the vehicle weight.

Other vehicle suspension systems use a strut in place of a shock absorber. One advantage of strut-type suspension systems is that they generally require less space, when compared to a shock absorber containing suspension system.

Although a suspension strut has many similarities to a shock absorber, it also has many differences. From a functional standpoint, a strut differs from a shock absorber because a strut not only performs the vibration dampening function provided by a shock absorber, but also performs the force controlling function that is provided by an upper control arm in shock absorber-containing systems. As such, a strut containing suspension system does not require an upper control arm.

Examples of strut-containing suspension systems are shown in the following United States Patents: Loffler, U.S. Pat. No. 3,759,542, Puchas, U.S. Pat. No. 3,810,651; Senft, et al., U.S. Pat. No. 3,871,467; Inoue, U.S. Pat. No. 4,511,160; Koide, U.S. Pat. No. 4,515,391; Kijima, et al., U.S. Pat. No. 4,542,920; Kijima, et al., U.S. Pat. No. 4,715,614; Kijima, et al., U.S. Pat. No. 4,715,615; Takizawa, et al., U.S. Pat. No. 4,758,018; Kondo, U.S. Pat. No. 4,765,647; Asanuma, et al, U.S. Pat. No. 4,790,560; Takata, et al, U.S. Pat. No. 4,817,755; Neff, U.S. Pat. No. 4,828,237; Takizawa, et al., U.S. Pat. No. 4,957,308; and Lee, U.S. Pat. No. 5,456,486.

Although the strut-based suspension systems disclosed in the patents set forth above all very likely perform their functions in a workmanlike manner, room for improvement exists. In particular, room for improvement exists in providing a suspension system that: (1) requires less space than known systems; and (2) is better designed to transfer loads to the frame of the vehicle. For example, Puchas, U.S. Pat. No. 3,810,651, discloses one of the shortcomings of most strut suspensions systems. In each of FIG. 1 and FIG. 2 of Puchas, it will be noted that the coil spring that surrounds the strut housing is generally disposed in a position generally above the tire. In particular, the coil spring is disposed in a position generally above and outside of the cylindrical plane defined by the outer tread surface of the tire. The space occupied by the coil spring and strut member is space that cannot be utilized as part of the trunk or interior of the vehicle, thus depriving the vehicle of some of its potential trunk space or interior cabin space.

It is therefore one object of the present invention to produce a strut-containing suspension system that is more compact than strut-containing suspension systems known previously.

SUMMARY OF THE INVENTION

In accordance with the present invention, a vehicle's suspension system is provided, to which can be mounted a vehicle wheel and tire, with the tire having a tread surface defining a cylindrical plane. The suspension system comprises a cross frame member having an inboard portion and an outboard portion. The outboard portion includes an upper spring seat portion. A spindle knuckle is provided with a spindle to which a wheel can be coupled. The spindle is coupled to the spindle knuckle. A suspension strut is coupled between the spindle knuckle and the cross frame member. The suspension strut includes a strut housing having a lower end and an upper end, a piston member axially movable with respect to the strut housing, and a lower spring seat fixedly coupled to the strut housing. A coil spring is disposed concentrically around the strut housing. The coil spring includes an upper end received by an upper spring seat, and a lower end received by the lower spring seat. The upper spring seat, lower spring seat, and coil spring are all disposed within the cylindrical plane defined by the tire tread surface. Preferably, the upper spring seat is positioned for receiving loads from the coil spring, and for transferring the loads to the inboard portion of the cross frame member, which is fixedly coupled to a vehicle frame (or body panel) member of the vehicle. The cross frame member transfers the loads received from the coil spring to the vehicle frame member.

Also, the coil spring preferably comprises a frusto-conically shaped coil spring which is disposed concentrically around the strut housing at an angle offset from the axis of the suspension strut. The suspension system also has other suspension components including a first lateral link having first end coupled to a spindle knuckle, and a second end coupled to the cross frame member; and a second lateral link having a first end coupled to a spindle knuckle and a second end coupled to the cross frame member. A trailing link extends between a body member of the vehicle and a first arm of the spindle knuckle. A control rod is provided which has a first end coupled to the second lateral link and a second end. A stabilizer bar has its first end coupled to the second end of the control rod, and an inboard portion coupled to the vehicle body member.

One feature of the present invention is that the coil spring which surrounds the strut is moved from a position above the wheel (outside the cylindrical plane formed by the vehicle tire's tread surface) to a lower position along side the wheel, and inside the cylindrical plane defined by the tire tread surface. This positioning allows a shorter strut to be used, and permits the upper strut mount to be moved to a position lower than is found in conventional suspension systems wherein the coil spring is positioned outside the diameter of the cylindrical plane. The positioning provided by the instant invention has the advantage of providing the vehicle with more room for use as trunk space, interior space, and for convertible top storage space.

Another feature of the present invention is that the suspension system includes a cross frame member that carries both the spring and the lateral link loads. The spring loads are fed through the suspension cross frame member directly into longitudinally extending side rails, floor panel members and other body panel members of the vehicle. This feature differs from conventional strut systems wherein the spring loads are usually fed to the upper wheel house.

One advantage of the cross frame member of the present invention is that it provides a suspension system wherein the loads generated by the spring are fed to a cross frame member, which is better at handling such leads than the upper wheel house, which is the member to which prior known designs feed the spring load.

The use of a cross frame member which is capable of carrying spring loads enables the designer to more efficiently design strength and stiffness into the cross frame, rail and floor of the vehicle, when compared to suspensions systems wherein the spring load is carried by the upper wheel house. Therefore, the engineer has more design flexibility, and a better ability to control noise and vibration caused by the suspension system.

These and other features of the present invention will become apparent to both those skilled in the art upon review of the drawings and description, presented below, of the best mode known currently of practicing the invention.

DETAILED DESCRIPTION

Figure 1:
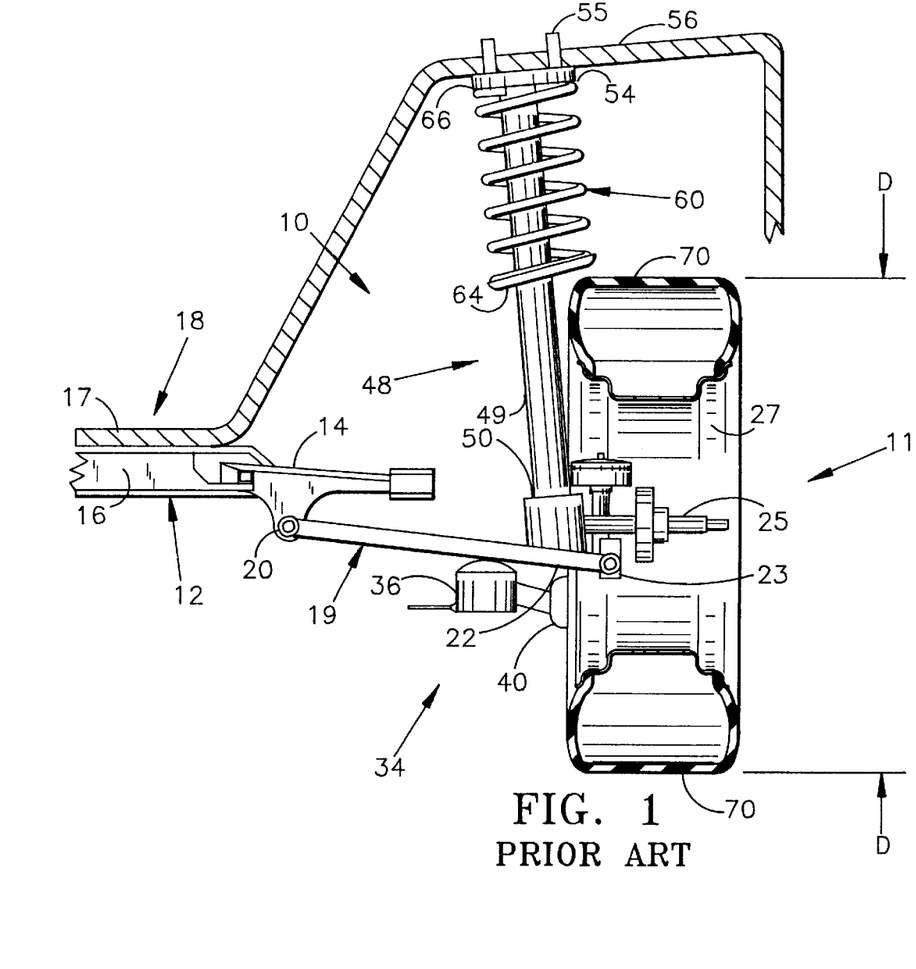
FIG. 1 is a perspective view of a prior art strut suspension system.

A prior art suspension system 10 is shown in FIG. 1, and is coupled between a tire 11 and wheel (not shown), and a cross frame member 12 of the vehicle. In the illustrated prior art suspension system 10, the cross frame member 12 extends generally laterally between the rear, non-driven wheels of a front wheel drive vehicle. The particular suspension system 10 shown in FIG. 1 is currently in use on the Dodge Intrepid, and the Chrysler Concord and LHS/New Yorker automobiles manufactured by the Chrysler Corporation, the assignee of the present invention.

The cross frame member 12 contains a wishbone-shaped outboard portion 14, and an inboard portion 16, having an upper surface that is welded or otherwise attached to a vehicle panel member, such as the trunk floor portion 17 of the vehicle panel member 18. A pair of lateral links including a forwardly disposed lateral link (not shown) and a rearwardly disposed lateral link 19. Each of the links 19 have an inboard end 20 that is pivotably coupled to the outboard portion 14 of the cross frame member 12, and an outboard end 22 that is pivotably coupled to a spindle knuckle 23. The spindle knuckle 23 includes a spindle 25, to which is mounted a hub and brake assembly (not shown), to which the wheel 27 is mounted.

The prior art suspension also includes a trailing link 34 having a forward end 36 pivotally attached to a vehicle panel member forwardly of the spindle knuckle 23, and a rearward end 40 that is pivotally coupled to the spindle knuckle 23.

A strut assembly 48 includes a generally vertically disposed, stationarily positioned strut housing 49, having an interior (not shown) for slideably receiving a piston (not shown). Examples of strut housing and piston arrangements are shown, for example, in Inoue, U.S. Pat. No. 4,511,160; Kijima et al, U.S. Pat. No. 4,542,920, and Takata et al U.S. Pat. No. 4,815,755.

The upper end 54 of the piston is attached by bolts 55 to a wheel house (or strut tower) portion 56 of the vehicle's underside body panel 18. A coil spring 60 is disposed concentrically around the strut assembly 48, to surround a portion of the strut assembly 48. This coil spring 60 extends from a lower, shelf-like spring seat 64 that is disposed on the strut housing 49, and an upper spring seat 66 that is disposed adjacent to the upper end 54 of the piston. The upper spring seat 66 is also adjacent to the wheel house 56 portion of the vehicle body panel 18.

The tire 11 is a conventional tire, having side walls and a road engaging, circumferential tread surface 70. The tread surface 70 defines a cylindrical plane D, having boundaries denoted by lines D—D.

As shown in FIG. 1, the upper spring seat 66 is disposed entirely outside of the cylindrical plane D defined by the tread surface 70 of the wheel 11. Further the coil spring 60 is disposed almost entirely outside of the cylindrical plane D defined by the tread surface 70, and the lower spring seat 64 is disposed at about the same level as the cylindrical plane D.

FIG. 1 illustrates a suspension system, similar to many of those shown in the prior art, insofar as the coil spring, lower spring seat 64 and upper spring seat 54 are all disposed generally above the tire, and outside the cylindrical plane D. Although this arrangement does serve well in imparting desired suspension characteristics to a vehicle, it does have some draw backs. First, it uses space that could otherwise be devoted to a more user accessible purpose, such as additional truck space, or additional cabin room. Additionally, the suspension system shown in FIG. 1 tends to cause the spring-loads 60 to be exerted against wheel house portion 56 of the vehicle body panel 18, rather than cross frame member 12.

The suspension system 90 of the present invention is shown in FIGS. 2–5. The strut containing suspension 90 is coupled between a cross frame member 92 and a tire 94 which is mounted on a wheel 97. The cross frame member 92 includes an inboard portion 96 that extends laterally all the way across the underside of the vehicle, and an outboard portion 98. The other end of the cross frame member 92 terminates in an outbound portion that is the mirror image of outboard portion 98. The inboard portion 96 includes an upper surface 100 which is bolted or otherwise secured to the underside surface of a side rail member 102. Side rail member 102 extends longitudinally along the underside of the vehicle, in a direction generally perpendicular to the direction in which the inboard portion 96 of the cross frame member 92 extends. The side rail member 102 extends beneath, and is coupled to a vehicle panel member, such as the trunk floor structure 106 of vehicle panel member 108.

The outboard portion 98 of the cross frame member 92 includes a frusto-conical portion 112, having a generally vertical axis. The frusto-conical portion 112 terminates at its upper end at an annular upper spring seat 114. The annular upper spring seat 114 defines an aperture through which the strut housing can pass. The diameter of the frusto-connical portion 112 is smaller at its upper end adjacent to the annular upper spring seat 114, than at its lower end. The axis of the frusto-connical portion 112 is not disposed at true vertical. Rather, it is angled from vertical, and is generally parallel, or co-linear with the axis of a frusto-connical coil spring 122.

The inboard portion 96 of the cross frame member 92 is fixedly coupled to the longitudinally extending side rail frame member 102, and hence the vehicle panel member frame member 106, for transferring loads received from the frusto-conically-shaped spring 122 to the longitudinally extending side rail frame 102, and ultimately to the vehicle frame panel member such as floor structure 106.

By transferring the loads from the side rail member 102 to floor structure 106, the loads imparted by the spring 122 can be distributed over a larger area (as compared to prior arts systems), as the loads are distributed over the entire length of the longitudinally extending side rail member 102. Side rail member 102 distributes its loads over a relatively longer area of the vehicle floor structure 106. Additionally, the longitudinally extending side rail frame 102 can be designed to be relatively thicker and stronger than the vehicle panel members 106, to help make the frame stiffer, and better suited to absorbing loads imparted by the coil spring 122.

A spindle knuckle 124 includes a spindle 126 having a generally horizontal axis, which also serves as the axis about which the wheel 97 and tire 94 rotate. A hub and brake assembly (not shown) can be mounted onto the spindle 126. The spindle knuckle 124 interacts with the suspension system in a manner which permits the spindle 126 to pivot upwardly and downwardly, to accomodate the vertical travel of a wheel as the wheel and tire 94 travel over a road surface.

The spindle knuckle 124 includes a generally forwardly extending spindle arm 128 and a rearwardly extending spindle arm 134 that is generally co-planar to the forwardly extending spindle arm 128. The spindle knuckle 124 also includes a strut mounting arm 136, which is disposed generally perpendicularly to each of the forwardly and rearwardly extending spindle arms 128, 134. The strut mounting arm 136 terminates at its inboard end in a collar member 138, which is provided for securely, fixedly receiving the housing 202 of the suspension strut 200.

Figure 4:
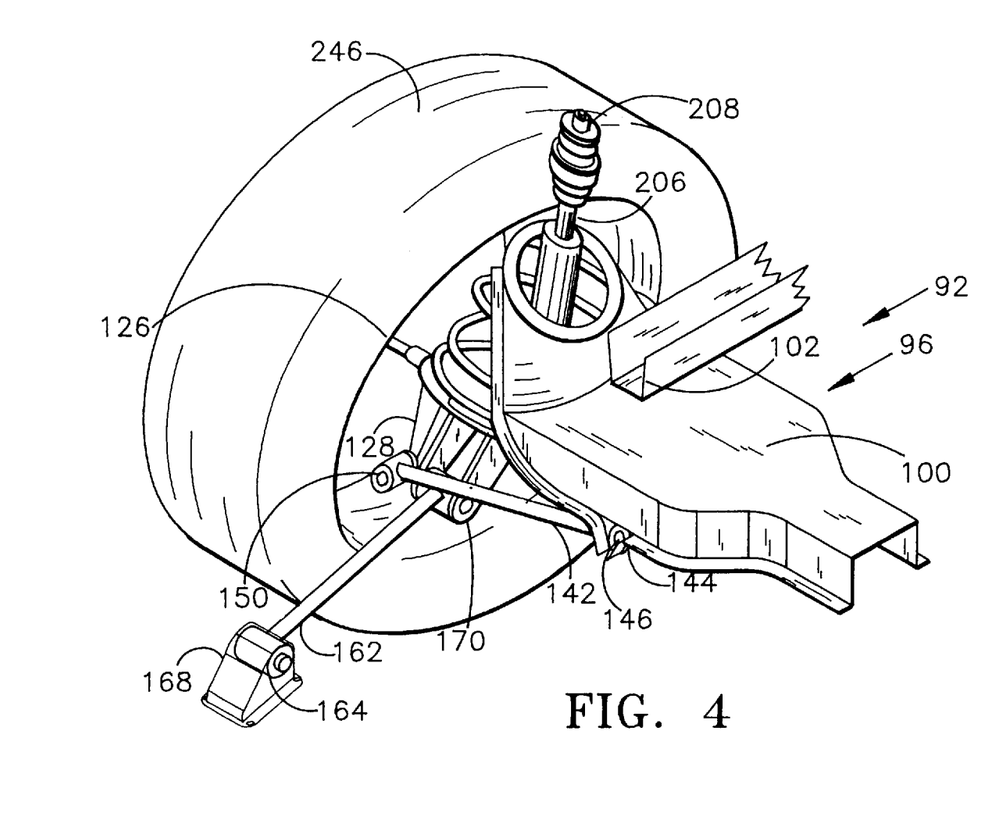
FIG. 4 is a front, perspective view of the present invention.

A first, or forwardly disposed lateral link member 142 includes an inboard end 144 which, as shown in FIG. 4, is pivotably mounted to a vertically extending flange portion 146 of the relatively inboard portion 96 of the cross frame member 92. The outboard end 150 of the first lateral link 142 is pivotably mounted, through a bushing or the like, to the forwardly extending spindle arm 128 of the spindle knuckle 124.

A second, rearwardly disposed lateral link 154 includes an inboard end 153, that is pivotably coupled to a flange portion (not shown) of the cross frame member 92, in a manner similar to the manner in which the inboard end 144 of lateral link 142 is pivotably coupled to flange 146 of the cross frame member 92. The outboard end 158 of the rearward, lateral link is pivotably coupled to the rearwardly extending second spindle arm 134.

A trailing link member 162 includes a first, or forward end 164 which is pivotably coupled to a body panel member through a hanger-cup type arrangement 168. The rearward or second end 170 the trailing link 162 is pivotably coupled to the forwardly extending spindle arm 128. As best shown in FIG. 4, the rearward end 170 the trailing link 162 is coupled to the spindle knuckle 128 in a position generally adjacent to the outboard end 150 of the forwardly disposed lateral link 142.

Figure 3:
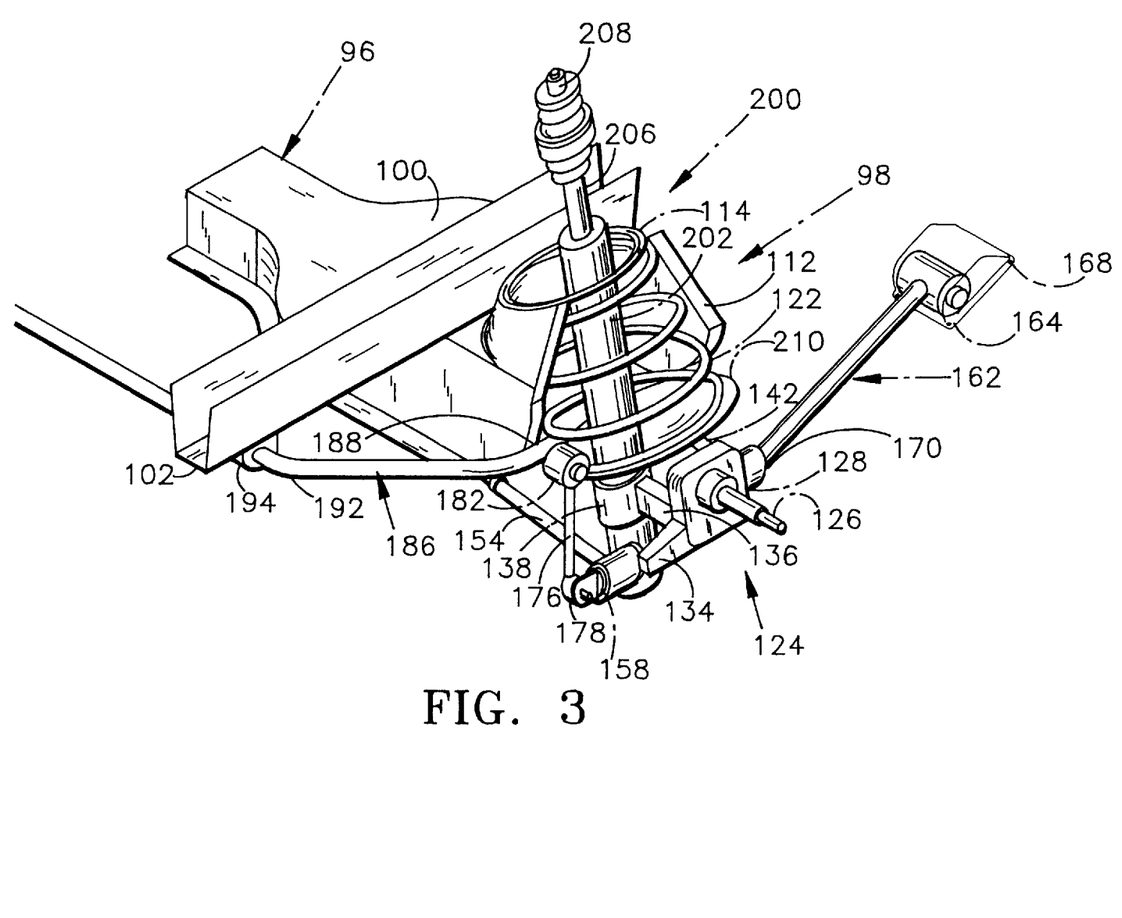
FIG. 3 is a rear, perspective view of the suspension system of the present invention shown with the tire and wheel removed.

As best shown in FIG. 3, a control rod 176 extends generally vertically, and includes a lower end 178 that is pivotably coupled to the rearwardly extending spindle knuckle arm 132, through the arm's 132 engagement with the rearwardly disposed lateral link 154. As shown in FIG. 3, the outboard end 158 of the rearward lateral link 154 is coupled to the rearwardly extending spindle knuckle arm 132, and the lower end 178 of the control rod 176 is coupled to the outboard end 158 of the rearwardly disposed lateral link 154 mounting stud. The upper end 182 of the control rod 176 is pivotably coupled to the outboard end 188 of stabilizer bar 186, that extends generally laterally across the width of the vehicle. The relatively inboard portion 192 of the stabilizer bar member 186 is pivotably coupled to a hanger member 194, which itself is fixedly coupled to the underside surface of the longitudinally extending frame member 102.

Figure 2:
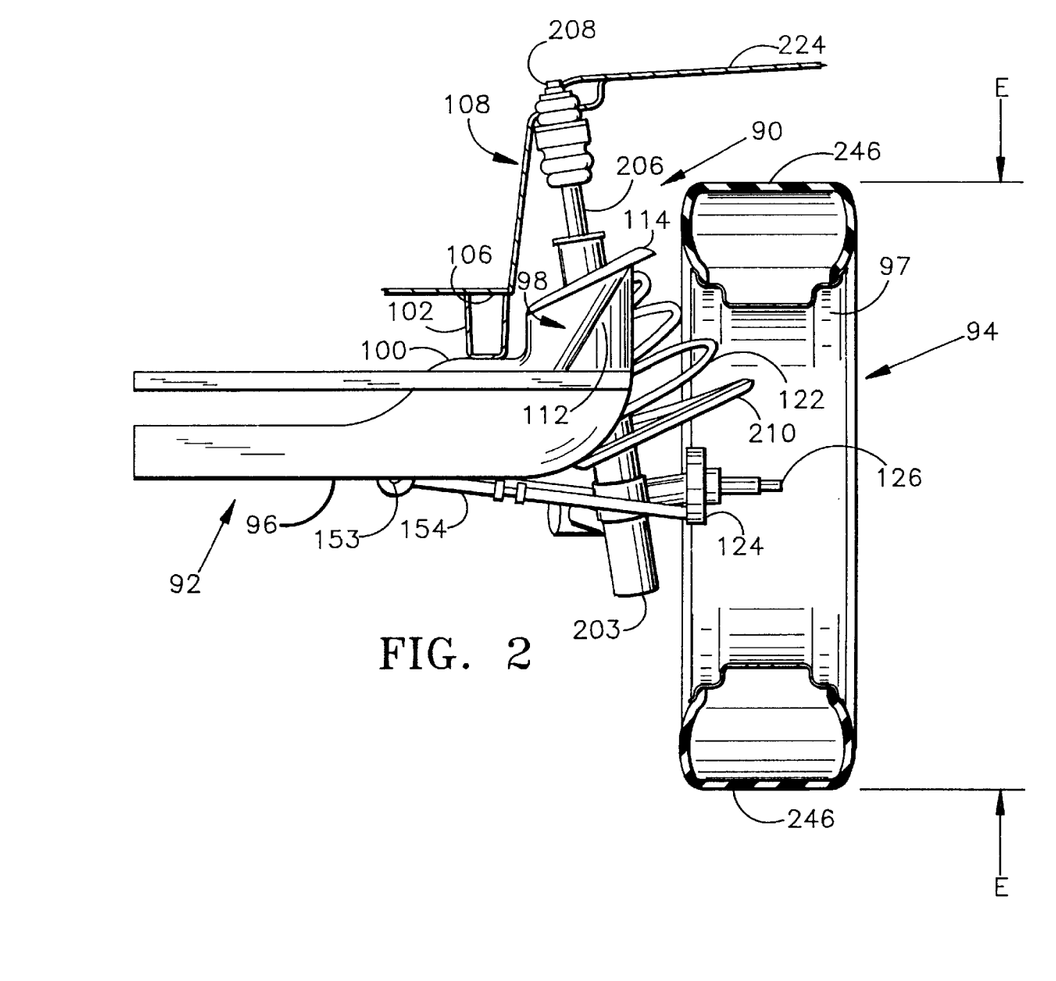
FIG. 2 is a rear elevational view of the suspension system of the present invention.

The strut assembly 200 is best shown in FIGS. 2 and 3 as including a strut housing 202 having a lower end and an upper end. The lower end is received by a collar 138 which grips the exterior of the strut housing 202 on its lower portion, approximately 1" to 2" (2.54–5.08 cm) above the lower most end 203 of the strut housing 202. A piston member 206 is axially moveable within the interior of the strut housing 202, and is insertable into an opening (not shown) formed in the upper end of the strut housing 202. The piston member 206 extends upwardly out of the opening of the strut housing 202. The piston member 206 includes an upper end 208 which is fixedly coupled to the wheel house portion 224 of the vehicle panel member 108.

A shelf-like lower spring seat 210 is coupled to the exterior of the strut housing 202, and is disposed at an angle to the axis of the strut housing 202. The lower spring seat 210 extends generally perpendicular to the axis of the frusto-conical-shaped coil spring 122. The lower spring seat 210 has a diameter generally large enough to receive the lower most coil of the coil spring 122.

An annular, elastomeric spring isolator ring 218 (FIG. 5) can be disposed adjacent to the annular upper spring seat 114 to vibrationally isolate the coil spring 202 from the cross frame member 92. The upper portion of the strut housing 202, and the piston 206 pass through the apperture defined by the annular upper spring seat 114.

Figure 5:
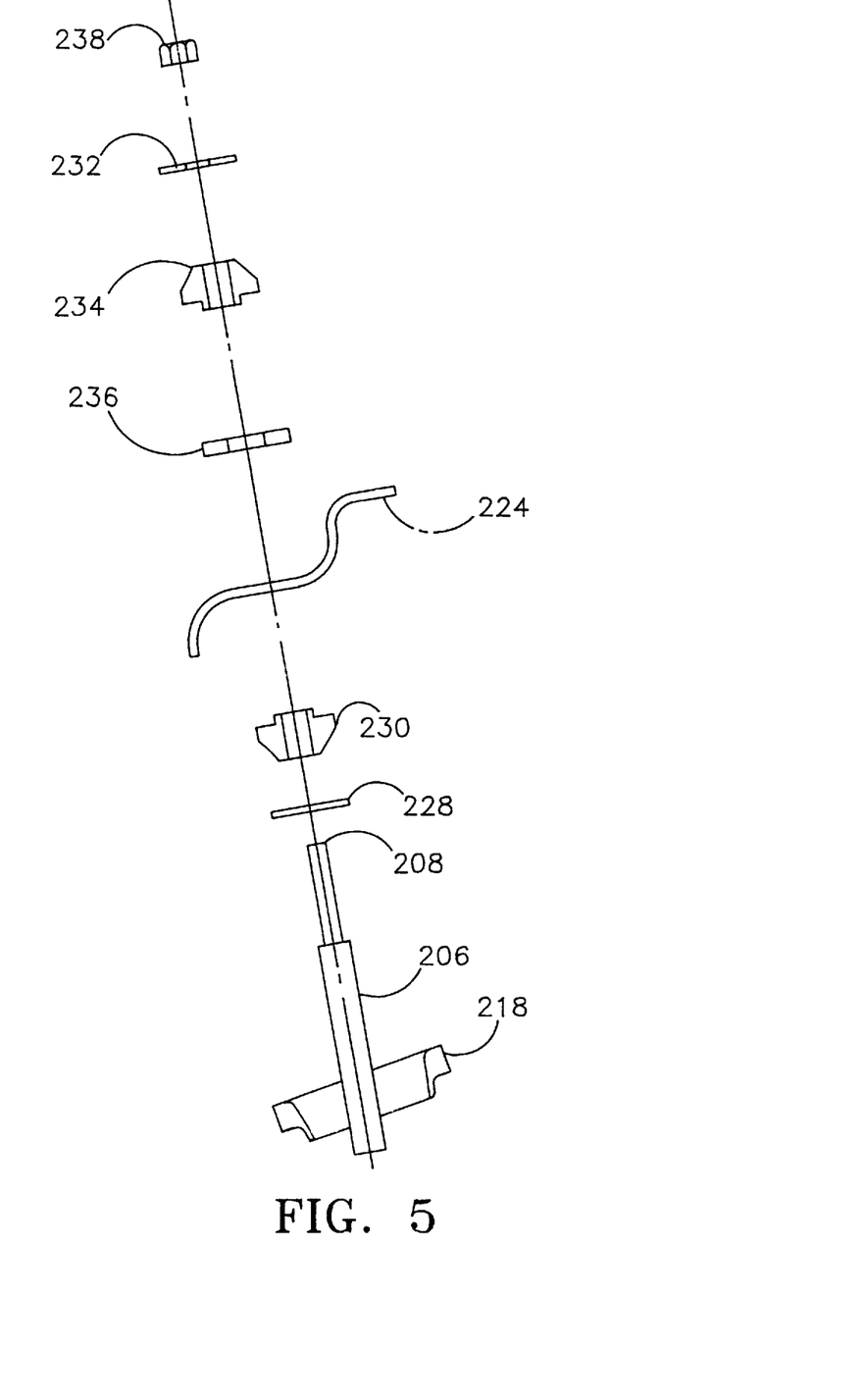
FIG. 5 is an exploded view of the strut mounting portion and hardware of the suspension system of the present invention.

The mounting hardware for mounting the upper end 208 of the piston 206 to the wheel well housing 224 portion of the vehicle panel member 108 is best shown in FIG. 5, as including a first retainer 228 and first bushing 230, both of which are disposed below the wheel housing 224. Each of the first retainer 228 and first bushing 230 include a central aperture for receiving the upper portion 208 of strut rod 206.

A second retainer, second bushing 234 and spacer member 236 are disposed above the wheel housing 224. Second retainer 232, second bushing 234 and spacer member 236 all include central apertures (not shown) through which the upper end 208 of strut rod 206 can pass. A nut 238 is threadedly engageable to the upper end 208 of strut rod 206, for securing, and fixedly mounting the upper end 208 of strut rod 206 to the wheel housing 224.

Comparing suspension 90 of FIG. 2, to prior art suspension 10 of FIG. 1, it will be noted that the suspension system 90 of the present invention is designed so that the upper spring seat 114, lower shelf-like spring seat 210, and coil spring 122 are configured much more compactly than their corresponding parts in the prior art suspension 10 shown in FIG. 1. All of the aforementioned upper spring seat 114, lower spring seat 210, and coil spring 122 of the suspension system 90 of the present invention are all contained within the cylindrical plane E—E defined by the circumferential tread surface 246 of tire 94. This relatively more compact arrangement permits the wheel housing 224 to be positioned relatively lower (when compared to wheel housing portion 56 of FIG. 1), to thus provide more potential trunk room and/or interior room. This additional trunk space is especially important in convertible vehicles, as this additional trunk space can provide additional space for storage of the retractor mechanism of the convertible top, or alternately, provide a deeper trunk in a vehicle whose trunk space is typically limited by the space necessary for receiving the convertible top.

It will also be noted that the loads imposed by the coil spring 122 on the suspension system 90 of the present invention are directed into the upper spring seat 114, which is a part of the cross frame member 92. The cross frame member 92, directs these forces to the side rail 102. This differs from the prior art suspension system 10 which directs these coil spring forces into the wheel house portion 56 of the vehicle body panel member 118. Through the arrangement of the present invention, the loads imposed by the coil spring 122 are imposed on vehicle components that are capable of better handling the loads, and better distributing the loads to other body components. Additionally, it is typically easier for a manufacturer to make the cross frame member 92 out of thicker steel than a body panel member, thus enhancing durability. Further, the longitudinal frame member 102, can better disburse the forces and loads imposed on it over a wider and larger portion of the vehicle panel 108. This suspension system 90 thereby enables the designer to engineer a more "stiff" frame to better help reduce rattles in the vehicle, and to also provide a stiffer suspension for the vehicle.

Having described the invention with reference to certain preferred embodiments, it will be appreciated by those skilled in the art that variations and modifications exist within the scope and spirit of the claims appended hereto.

What is claimed:

1. A vehicle suspension system to which can be mounted a vehicle wheel and a tire, the tire having a tread surface defining a cylindrical plane, the suspension system comprising:
   (1) a cross frame member having a relatively inboard portion and an outboard portion, the outboard portion including an upper spring seat portion;
   (2) a spindle knuckle;
   (3) a spindle to which the vehicle wheel can be coupled, the spindle being coupled to the spindle knuckle;
   (4) a suspension strut coupled between the spindle knuckle and the cross frame member, the suspension strut including:
      (a) a strut housing having a lower end and an upper end;
      (b) a piston member axially moveable with respect to the strut housing; and
      (c) a lower spring seat fixedly coupled to the strut housing; and
   (5) a coil spring disposed concentrically around the strut housing, the coil spring including an upper end received by the upper spring seat portion, and a lower end received by the lower spring seat;
   wherein the upper spring seat, lower spring seat, and coil spring are disposed within the cylindrical plane defined by the tire tread surface.

2. The vehicle suspension system of claim 1 wherein the piston member includes an upper end disposed exteriorly of the housing and a lower end disposed interiorly of the housing, the upper end being coupled to a body panel member of the vehicle.

3. The vehicle suspension system of claim 1 wherein the upper spring seat portion is positioned for receiving loads from the coil spring, and transferring said load to the inboard portion of the cross frame member.

4. The suspension system of claim 3 wherein the inboard portion of the cross frame member is fixedly coupled to a vehicle frame member, for transferring loads received from the coil spring to the vehicle frame member.

5. The vehicle suspension system of claim 4 wherein the vehicle frame member comprises a longitudinally extending side rail frame member.

6. The suspension system of claim 4 wherein the vehicle frame member comprises a vehicle floor panel member.

7. The suspension system of claim 4 wherein the vehicle frame member comprises a laterally extending frame member.

8. The suspension system of claim 4 further comprising
   (a) a first lateral link extending between the cross frame member and the spindle knuckle; and
   (b) a second lateral link extending between the cross frame member and the spindle knuckle.

9. The suspension system of claim 8 wherein the first and second lateral links extend beneath the lower spring seat of the suspension strut.

10. The suspension system of claim 8 wherein the spindle knuckle includes a strut mounting arm that extends generally parallel to the first and second lateral links, the strut mounting arm including a collar means for fixedly coupling the spindle knuckle to the strut housing, and for transferring loads from the spindle knuckle to the strut housing.

11. The suspension system of claim 4 wherein the spindle knuckle includes a first forwardly extending arm and a second rearwardly extending arm, further comprising:
   (a) a first lateral link member extending between the cross frame member and the first forwardly extending arm of the spindle knuckle; and
   (b) a second lateral link member extending between the cross frame member and the second, rearwardly extending arm of the spindle knuckle.

12. The suspension system of claim 11, further comprising a trailing link member having a first end coupled to a body panel member of the vehicle, and a second end coupled to the first, forwardly extending arm of the spindle knuckle.

13. The suspension system of claim 12 wherein the spindle knuckle includes a strut mounting arm extending generally perpendicular to the first forwardly extending arm and the second rearwardly extending arm, the strut mounting arm including a collar means for fixedly coupling the spindle knuckle to the strut housing, for transferring loads from the spindle knuckle to the strut housing.

14. The suspension system of claim 12 wherein the second end of the trailing link member is coupled to the first forwardly extending arm of the spindle knuckle, and is positioned adjacent to the first lateral link member.

15. The suspension system of claim 11 wherein the suspension system includes a control rod and a stabilizer bar member.

16. The suspension system of claim 15 wherein the control rod includes a first end coupled to the second lateral link member and a second end coupled to the stabilizer bar, and the stabilizer bar includes a first end coupled to the control rod, and an inboard portion coupled to a body frame member.

17. The suspension system of claim 1 wherein the spring seat portion of the cross frame member includes a generally frusto-conical portion for receiving the coil spring, the frusto conical portion terminating in an annular seat for engaging the coil spring, the annular seat defining an aperture through which the suspension strut can pass.

18. The suspension system of claim 17 where the coil spring comprises a frusto-conical spring having an upper end and a lower end, the diameter of the upper end of the coil spring being smaller than the diameter of the lower end of the spring.

19. The suspension system of claim 18 wherein the coil spring has a longitudinal axis, and the suspension strut has a longitudinal axis, the longitudinal axis of the coil spring being offset from the longitudinal axis of the suspension strut.

20. A vehicle suspension system to which can be mounted a vehicle wheel and tire, the tire having a tread surface defining a cylindrical plane, the suspension system comprising:
   (1) a cross frame member having an inboard portion and an outboard portion, the outboard portion including a generally fruste-conical portion terminating in an annular upper spring seat, the annular upper spring seat defining an aperture, the inboard portion being fixedly coupled to a body member of the vehicle for transferring loads to the body member;
   (2) a spindle knuckle including:
      (a) a spindle to which the vehicle wheel can be coupled;
      (b) a first forwardly extending arm portion;
      (c) a second, rearwardly extending arm portion; and
      (d) a strut mounting arm including coupling means for coupling the strut mounting arm to a suspension strut.
   (3) a suspension strut coupled to the spindle knuckle and to the cross frame member, the suspension strut including:
      (a) a strut housing having a lower portion coupled to the strut mounting arm, and an upper portion;
      (b) a piston member axially moveable with respect to the strut housing, the piston member including a lower end disposed interiorly of the strut housing, and an upper end disposed exteriorly of the strut housing and coupled to a body panel member of the vehicle; and
      (c) a shelf-like lower spring seat coupled to the strut housing above the point at which the coupling means of the strut mounting arm engages the lower portion of the strut housing;
   (4) a frusto-conically shaped coil spring disposed concentrically around the strut housing at an angle offset from the axis of the suspension strut, the coil spring including;
      (a) a first end engageable with the annular upper spring seat formed on the cross frame member; and
      (b) a second end engageable with the shelf-like lower spring seat;
   (5) a first lateral link having a first end coupled to the first forwardly extending arm of the spindle knuckle and a second end pivotably coupled to the cross frame member;
   (6) a second lateral link having a first end coupled to the second rearwardly extending arm of the spindle knuckle and a second end pivotably coupled to the cross frame member;
   (7) a trailing link member having a first end coupled to a body member of the vehicle, and a second end pivotably coupled to the first forwardly extending arm of the spindle knuckle;
   (8) a control rod having a first end coupled to the second lateral link and a second end; and
   (9) a stabilizer bar having a first end coupled to the second end of the control arm, and an inboard portion coupled to a vehicle body member, wherein the upper spring seat, lower spring seat, and coil spring are disposed with the cylindrical plane defined by the tire tread surface.

\* \* \* \* \*